May 4, 1937.  T. V. DILLSTRÖM  2,078,934
INTERNAL COMBUSTION ENGINE
Filed Sept. 21, 1933   3 Sheets-Sheet 1

INVENTOR
Torbjörn Viktor Dillström
BY
Wm J. Hedlund
his ATTORNEY

May 4, 1937. T. V. DILLSTRÖM 2,078,934
INTERNAL COMBUSTION ENGINE
Filed Sept. 21, 1933 3 Sheets-Sheet 2
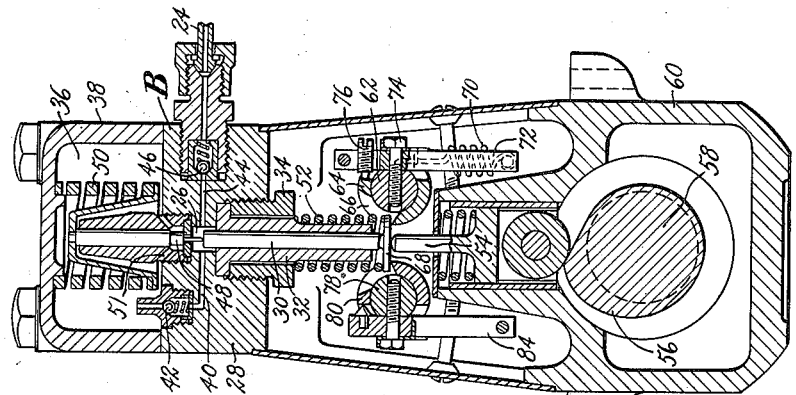
INVENTOR
Torbjörn Viktor Dillström
BY
Wm T Hedlund
his ATTORNEY May 4, 1937. T. V. DILLSTRÖM 2,078,934
INTERNAL COMBUSTION ENGINE
Filed Sept. 21, 1933 3 Sheets-Sheet 3
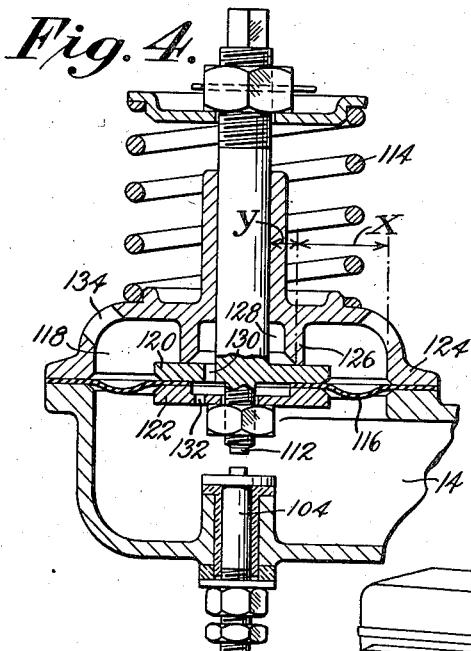
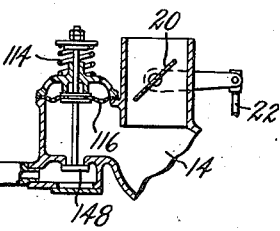
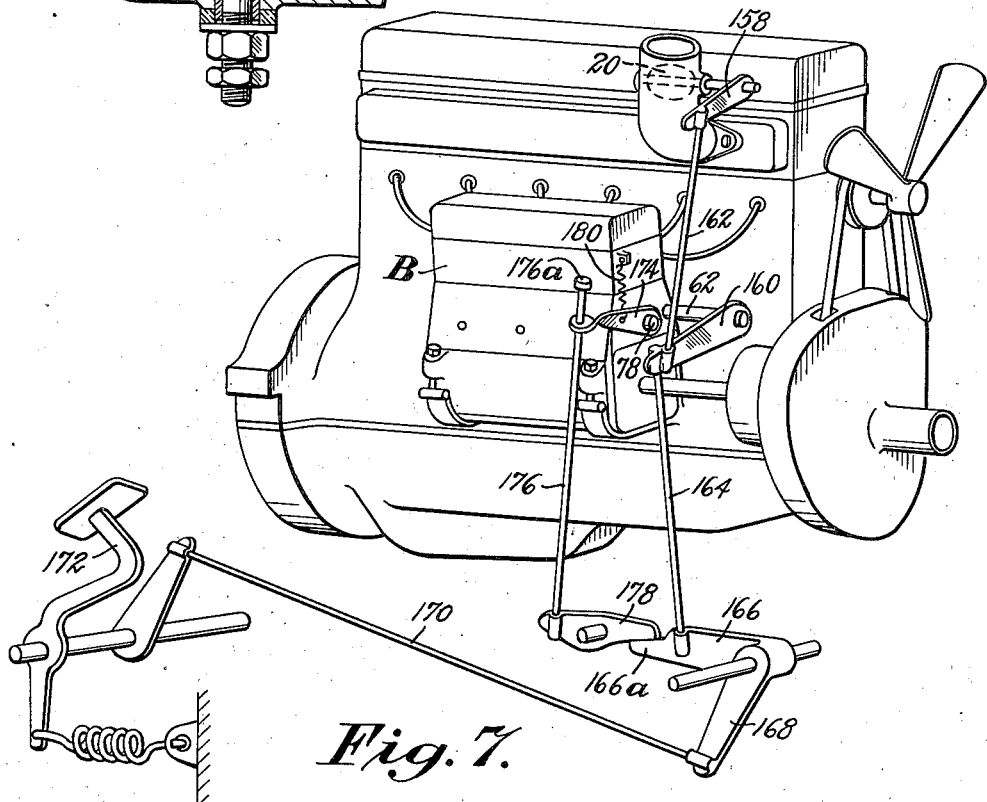
INVENTOR
Torbjörn Viktor Dillström
BY
Wm T. Hedlund
his ATTORNEY Patented May 4, 1937

2,078,934

UNITED STATES PATENT OFFICE 2,078,934

INTERNAL COMBUSTION ENGINE

Torbjörn Viktor Dillström, Stockholm, Sweden, assignor to Hesselman Motor Corporation, Ltd., London, England, a corporation of Great Britain Application September 21, 1933, Serial No. 690,304
In Sweden February 6, 1933

15 Claims. (Cl. 123—139)

The present invention relates to internal combustion engines. More particularly the invention relates to multiple cylinder internal combustion engines of the solid or airless injection type. Still more particularly the invention relates to engines of the above character adapted to be operated at loads of different value in contrast to constant load operation.

In the operation of internal combustion engines of the airless or solid injection type, particularly engines of the character in which ignition is effected by a timed ignition device, it is highly desirable in order to secure the most reliable ignition of small fuel charges to throttle the air for combustion admitted to the engine as well as to reduce the amount of fuel supplied when the engine is operated in a range corresponding to loads less than full load. It is further desirable to maintain a desired relation between the amounts of fuel and air admitted to the cylinders of the engine throughout the range of operation in which the air is throttled, including operation at minimum load or idling operation of the engine.

The degree of throttling increases with decrease of load and the greater the degree of throttling the more likely is proper combustion to be disturbed by slight variations from the correct amount of air supplied. It will be evident that at very light or idling load on the engine very slight errors in the amount of air admitted, while they may be insignificant when considered from a standpoint of their absolute value, nevertheless effect a considerable variation in the relative proportions of fuel and air forming the constituents of the charges in the engine cylinders.

Particularly in the case of engines for self-propelled vehicles it is difficult to secure the admission of exactly the right amount of air under all of the different running conditions which are encountered. External factors, such as changes of weather, leakage of the air intake valves of the engine, unequal distribution of the air for combustion to the several cylinders, very sudden changes of load conditions, and other circumstances may readily affect the air supply in a manner causing the fuel-air mixture in the cylinders to deviate from the desired relation. For example, when the air is to an extreme degree throttled the pressure in the combustion chambers of the engine at the time when the engine intake valves open may be equal to or higher than atmospheric pressure while the pressure in the engine induction pipe or inlet manifold is considerably less than atmospheric pressure. As a result, exhaust gases from the combustion chamber will flow through the intake valves to the inlet manifold until the pressure difference is balanced, the flow being then reversed through the open inlet valves during the suction stroke of the pistons. In such cases the result may be that some of the cylinders of the engine receive a charge comprising a relatively large proportion of exhaust gases while other cylinders may receive charges containing substantially nothing but fresh air. Under such conditions it is obvious that satisfactory combustion of even charges in the several cylinders cannot be relied upon.

The present invention has for a general object the elimination of difficulties heretofore encountered in the operation of engines of the character under discussion by eliminating the extreme sensitiveness of operation thereof when operated in accordance with previously known methods.

In accordance with the present invention, the air supplied to the engine is not throttled at idling load or at very low loads of the order of idling load to the extreme degree which would be required if all of the engine cylinders were operated at such loads, but by rendering one or more of the cylinders of the engine inoperative to perform work at loads below a predetermined value, the work necessary to operate the engine at loads below such predetermined value is obtained from the remaining or working cylinders, which cylinders operate with better combustion than would be obtained with all cylinders operating with the combustion air throttled to an extreme degree. If, for example, the engine were run idly with all cylinders in operation, it would be desirable to throttle the air to such an extent that an over-rich mixture would be produced, in order to insure as far as possible the reliable ignition of the charges under the very low load operation conditions. Operation with an over-rich mixture is, however, undesirable for a number of reasons, and in accordance with the present invention it is proposed to obtain steady and reliable operation of the engine at low or idling load by operating it with a vacuum in the inlet manifold of somewhat less value than that which would have to be maintained if all cylinders were maintained in operation at such load. The extent to which the vacuum should be reduced depends on a number of conditions, the most important of which is the number of cylinders which are cut out of operation, but which also include the design of the combustion chambers of the cylinders, the character of the fuel, and other factors. Preferably, the value of the vacuum which it is desirable to employ with an engine running idly on all cylinders is reduced by approximately ten per cent in accordance with the present invention, but the degree of reduction of the vacuum may be as much as fifteen or twenty percent.

It may be stated, however, as a general rule, that the ratio of air to fuel supplied to the cylinders at the time when one or more of the cylinders are cut out of action should as far as possible be maintained in the cylinders that remain in operation when the engine is operated with less than the total number of cylinders working.

The invention may be carried into effect in many different ways, but it is preferable to cut out of operation those cylinders which are rendered inoperative by means automatically responsive, either directly or indirectly, to the movement of the member or members controlling the throttling of the air supply. Furthermore, it is advantageous to render the desired number of cylinders inoperative in engines of the character under discussion by rendering inoperative a corresponding number of fuel pumps for supplying fuel thereto.

For a more complete understanding of the nature of the invention, which includes novel means for effecting the desired control as well as the novel method of operation, reference may be had to the following description of the several forms of apparatus suitable for carrying the invention into effect and illustrated in the accompanying drawings forming a part of this specification.

In the drawings:

Fig. 2 is a side view partly in section and on an enlarged scale of the pump unit shown in Fig. 1;

Fig. 3 is a section taken on the line 3—3 of Fig. 2;

Fig. 4 is a view on a larger scale of a preferred form of pressure responsive means of the character shown in Fig. 1;

Fig. 6 is a view showing a different arrangement of pressure responsive apparatus for controlling part of the structure shown in Fig. 1; and Fig. 7 is a more or less diagrammatic perspective view showing still another form of apparatus for controlling the fuel and air supplied to the engine in accordance with the invention.

Figure 1:
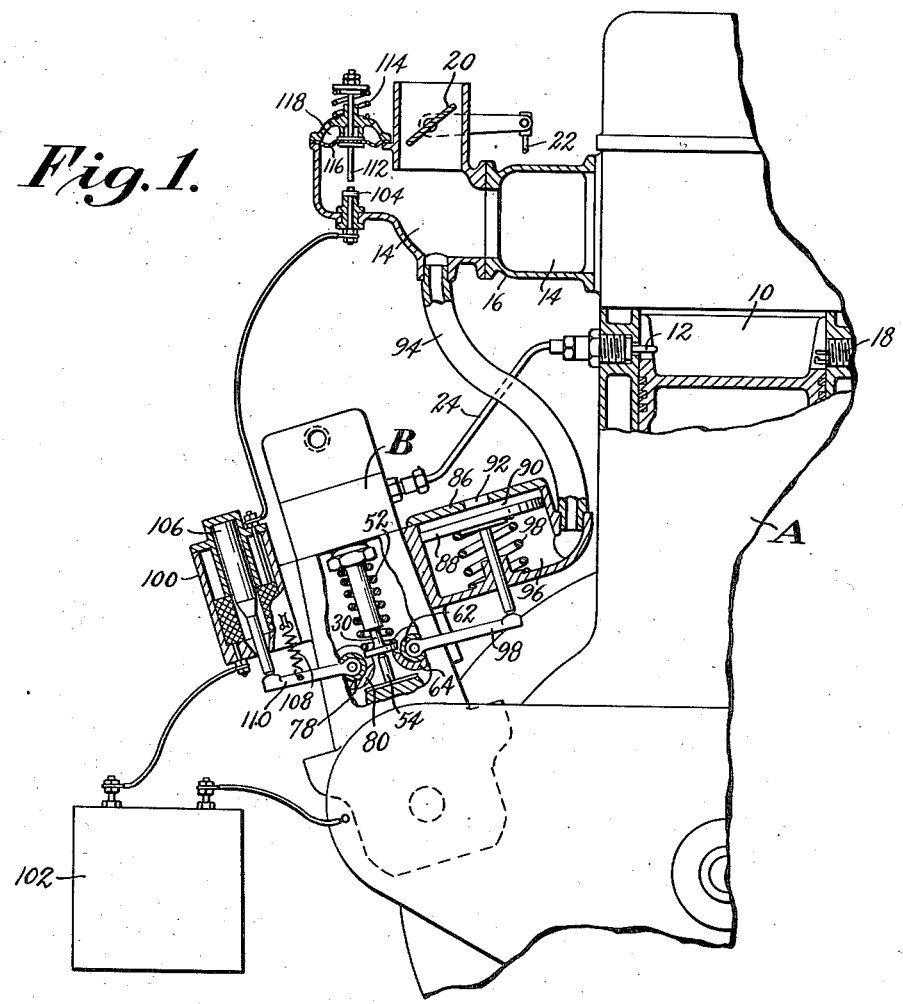
Fig. 1 is a more or less diagrammatic end elevation, partly in section, of an engine provided with apparatus embodying the invention.

Referring now more particularly to Fig. 1, A designates the engine, the combustion chamber of one of the cylinders thereof being indicated at 10. Fuel is injected into the cylinder by means of injection nozzle 12, and air is supplied to the cylinder through the usual intake valve (not shown) which is in communication with the inlet passage 14 of the induction pipe or manifold 16 which is adapted to supply air to the several cylinders of the engine. Ignition is effected by the spark plug indicated at 18. The engine illustrated is adapted to be operated in accordance with the method disclosed in U. S. Patent No. 1,835,490 granted December 8, 1931 to K. J. E. Hesselman, but the present invention is not limited in its application to such engines. Control of the amount of air admitted to the manifold 16, and consequently the pressure obtained in the inlet passage 14 is effected by means of the usual throttle valve 20 operated by the throttle rod 22 which may be connected for either manual or automatic control.

Fuel is supplied to the injection nozzles 12 of the several cylinders by means of a pump unit indicated generally at B and comprising a plurality of pumps, one for each cylinder of the engine, the discharge passages of the several pumps being connected to the injection nozzles by means of pipes 24.

Turning now more particularly to Figs. 2 and 3, the pump unit B illustrated is that for a six-cylinder engine, and comprises six separate plunger pumps, one of which is shown in section in Fig. 3. Since the construction of the pumps is identical, a description of one is sufficient. A pump chamber 26 is provided in a central casing part 28 which is preferably in the form of an integral block and the pump plunger 30 is mounted in a suitable barrel 32 retained in block 28 by means of the retainer member 34. Fuel is admitted to chamber 36 formed in the casing part 38 and flows from chamber 36 through the inlet passage 40 controlled by the check valve 42 to the pump chamber 26. Fuel discharged from chamber 26 passes through passage 44 controlled by check valve 46 to the delivery pipe 24. A relief valve 48 seated by spring 50 and adapted to be opened by contact of the inner end of plunger 30 prior to the end of the discharge stroke of the plunger provides for quick cut off of the discharge of fuel, excess fuel from the pump chamber being returned to chamber 36 through passages 51.

The pump plunger is moved outwardly on its suction stroke by means of the pump spring 52 and inwardly on its discharge stroke by means of tappet 54 actuated by cam 56 on cam shaft 58 which is mounted in the lower casing member 60. At its ends casing member 60 is provided with upwardly extending end walls 60a and 60b to which the block 28 is bolted at its ends.

Regulation of the length of the effective discharge strokes of the pump plungers is effected by means of a rock shaft 62 having a plurality of sleeves 64 mounted thereon, there being one sleeve for each pump. Each sleeve 64 has an opening 66 providing an edge adapted to contact the lower face of collar 68 on the corresponding pump plunger 30. Each of the sleeves 64 is connected by means of a spring 70 to a pin at the end of an arm 72 fixed to shaft 62 by means of bolt 74, there being an opening in the sleeve 64 at the point where the arm 72 is bolted to the shaft. It will be evident that if shaft 62 is turned in clockwise direction as viewed in Fig. 3, sleeve 64 will be turned therewith to effect shortening of the stroke of the plunger on its suction stroke, and consequently shortening of the next ensuing discharge stroke. The spring 70 is strong enough to hold sleeve 64 in contact with the abutment provided by the adjusting screw 76 on arm 72 against the counter pressure of the pump spring 52, but is not sufficiently strong to effect movement of the pump plunger 30 inwardly against the pressure required to force fuel from the pump through the discharge passage to the injection nozzle. This resilient connection provides against adjustment to shorten the stroke of the pump plunger at the wrong time in the cycle of operation of the pump, for example, during a period of the pump cycle corresponding to the exhaust stroke of the cylinder with which the pump is associated.

For the purpose of rendering one or more of the pumps inoperative to supply fuel to their respectively associated cylinders, a second shaft 78 is provided, similar to shaft 62, which has slidably mounted thereon a number of sleeves 80 corresponding in number to the number of pumps it is desired to render inoperative. Sleeves 80 are similar in construction to sleeves 64 on shaft 62 and are connected to the shaft through the medium of springs 82 and arms 84 in a manner similar to the manner in which sleeves 64 are connected to shaft 62. It will be evident that turning of shaft 78 in counterclockwise direction may effect movement of the pump plungers with respect to which sleeves 80 are associated to a position such that these plungers are out of contact with their cooperating tappets 54 in all positions of the latter. In the embodiment illustrated it will be seen from Fig. 2 that sleeve 64 of shaft 62 is associated with each of the pump plungers of the six-cylinder pump unit whereas only three sleeves 80 are mounted on the shaft 78 for the purpose of cutting out pumps. It will be understood, of course, that while the three sleeves 80 are shown as associated with three adjacent pumps, the relation of the cams operating these pumps and the connections from these pumps to the cylinders of the engine are such that cutting out these three pumps serves to cut out of operation three cylinders of the engine suitably spaced with respect to timing in the cycle of operation of the engine as a whole. Obviously, the number of pumps to be rendered inoperative may be varied by varying the number of sleeves 80, but I prefer in most instances, in accordance with the present invention, to cut out of action half of the cylinders of the engine.

While for purposes of illustration I have shown a preferred form of fuel injection pump unit, it will be understood that the specific details of construction of the fuel supplying device form per se no part of the present invention. The novel features of construction of the pump unit herein illustrated by way of example are disclosed and claimed in my copending application, Serial No. 690,303, filed September 21, 1933, and the disclosure in said application may be considered as incorporated herein.

Referring again to Fig. 1, the apparatus for carrying the invention into effect with the pump unit just described comprises a vacuum cylinder 86 in which is slidably mounted piston 88. Cylinder 86 provides a chamber 90 in communication with the atmosphere by way of port 92 and to which one face of piston 88 is exposed. The opposite face of piston 88 is exposed to the pressure of the air in the intake passage 14, which is in communication by way of connection 94 with the chamber 96. A spring 98 in chamber 96 tends to move the piston 88 upwardly as seen in Fig. 1. Piston 88 is connected by means of the lever arm 98 to shaft 62 of the pump unit and, as will be evident from the drawings, decrease in pressure in the intake passage 14 due to throttling of the air admitted thereto will cause piston 88 to move downwardly against the action of spring 98 to turn shaft 62 in clockwise direction and effect shortening of the strokes of the pump plungers 30.

Actuation of the shaft 78 to effect cutting out of some of the pumps is in the present embodiment effected electrically. The apparatus for performing this function comprises a solenoid 100 the coil of which is connected at one end to a terminal (preferably the positive terminal) of a storage battery 102 or other source of electric current and at its other end to an insulated contact 104 in the air inlet passage 14. The remaining terminal of the battery 102 is grounded on the engine. The plunger 106 of the solenoid is held in the position shown, when the solenoid is not energized, by spring 108 acting on arm 110 which is fixed to shaft 78, and when the solenoid is not energized, the parts will be in the position shown in Fig. 1, in which position the sleeves 80 associated with shaft 78 are out of contact with their associated pump plungers and consequently have no effect thereon. When the solenoid is energized the plunger 106 will move downwardly, effecting counterclockwise movement of shaft 78 as viewed in Fig. 1, and causing the pumps with which sleeves 80 are associated to be moved upwardly to a position rendering these pumps inoperative to supply fuel.

Solenoid 100 is actuated by means of pressure responsive apparatus comprising a slidably mounted contact pin 112 which is held away from the contact 104 by means of spring 114, the tension of which is preferably made adjustable, and which is moved into engagement with contact 104 by movement of diaphragm 116 to which the contact pin 112 is attached. Diaphragm 116 is exposed on its lower face to the pressure in the intake passage 14 and its upper face is exposed to atmospheric pressure in the chamber 118.

It will be evident that when the pressure in the intake passage 14 falls to a predetermined value which is determined by the tension of the spring 114, pin 112 will be moved into contact with the contact 104, thus closing the circuit in which the solenoid 100 is located and energizing the latter to turn the shaft 78 to a position effecting cutting out of the desired number of pumps.

In Fig. 4 I have shown in detail on an enlarged scale a preferred form of pressure responsive apparatus for use in the arrangement shown in Fig. 1 or similar electrically actuated arrangements. In this arrangement the central portion of the diaphragm 116 is clamped between the upper and lower plates 120 and 122 and the upper casing part or cap 124 is provided with an annular downwardly extending flange 126 providing a seat adapted to contact the plate 120 when the diaphragm is in its upper position, thus providing within the flange a chamber 128 which is in communication with the main air inlet passage 14 by way of a passage provided by ports 130 and 132 in plates 120 and 122 respectively. Chamber 118 outside of the flange 126 is in communication with the atmosphere by way of ports 134.

When the apparatus is in the position shown in Fig. 4 the effective diaphragm area exposed to atmospheric pressure is an annulus, the radial extent of which is represented by the distance X. However, as soon as the decrease in pressure in the inlet passage 14 reaches the predetermined value sufficient to move the diaphragm downwardly, plate 120 moves away from the flange 126 and the area exposed to atmospheric pressure is increased by the annulus, the radial extent of which is indicated at Y. In other words, when the apparatus as shown is in the position shown in Fig. 4 chamber 128 is exposed to intake pressure and when moved away from this position, chamber 128 is exposed to atmospheric pressure. This arrangement prevents flutter or chattering of the diaphragm and the movable contact 112 under the influence of slight variations in pressure in the intake passage 14 when the pressure therein is at or near the predetermined value for causing movement of the contact.

The specific manner in which regulation of the length of the strokes of the several pumps is effected and the manner in which the cutting out of one or more of the pumps is effected is subject to wide variation.

Figure 5:
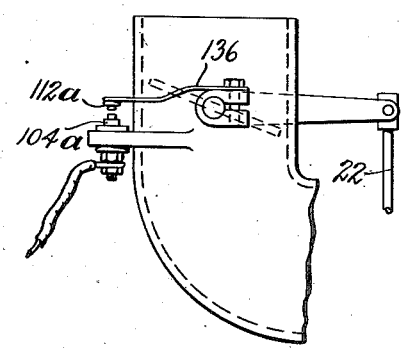
Fig. 5 is a view showing a different arrangement for controlling the energizing of part of the apparatus shown in Fig. 1.

In Figs. 5 to 7 I have illustrated embodiments of such variations in apparatus for controlling the pump unit in accordance with the invention. The apparatus shown in Fig. 5 is adapted to be used in connection with electrically actuated means and comprises a fixed insulated contact 104a and a movable contact 112a which instead of being actuated by pressure responsive means is mechanically connected to the throttle actuating means 22 by means of the spring arm 136. As will be evident from the drawings, contacts 104a and 112a will be brought into contact to close the electric circuit and energize the actuating means such as solenoid 100 in Fig. 1 upon movement of the throttle to a predetermined position.

Fig. 6 illustrates an arrangement whereby actuation of the pump control mechanism to cut out certain pumps is effected through the medium of the suction produced in the engine intake 14. In this arrangement a piston 138 in cylinder 140 is connected to the shaft 78 of the pump unit B by means of the lever arm 142. Chamber 144 in cylinder 140 below piston 138 is connected through conduit 146 to the engine intake passage 14 under the control of a valve 148 adapted to be actuated by pressure responsive apparatus comprising diaphragm structure indicated at 116 and preferably constructed in accordance with the arrangement shown in Fig. 4. The chamber 150 above piston 138 is in communication with the atmosphere and the piston is normally moved upwardly by spring 152, the arm 142 being biased by spring 154.

From the drawings it will be evident that the arrangement works in general in the same manner as the arrangement shown in Fig. 1 to cause the shaft 78 to be turned in counter clockwise direction so as to cut out the desired number of pumps when a predetermined pressure is produced in the intake passage 14 due to throttling. When the pressure in passage 14 is above the predetermined value, valve 148 is closed under the influence of spring 114 and spring 152 maintains piston 138 in the position shown in Fig. 6, in which position of the piston the shaft 78 is in a position of rotation such that the sleeves 80 associated therewith are out of contact with the pump plungers in all positions of the latter. When the pressure in the passage 14 is reduced to the predetermined value by throttling, movement of diaphragm 116 under differential pressure opens valve 148, and the resulting suction on the underside of piston 138 moves the latter downwardly so as to rotate shaft 78 and associated sleeves 80 to a position such that the plungers of the pumps desired to be cut out of contact with the tappets 54 in any position of the latter.

Fig. 7 illustrates a wholly mechanical arrangement for controlling throttling of the air and for effecting regulation and control of the pumps in the pump unit B. The throttle valve 20 and the pump regulating shaft 62 are connected by means of suitable levers 158 and 160 and links 162 and 164 to one arm 166 of a bell crank lever, the other arm 168 of which is connected by means of a suitable link or rod 170 to a manually operable pedal mechanism indicated generally at 172.

A lever 174 fixed on shaft 78 of the pump unit is connected by means of rod 176 to a pivoted lever 178. Rod 176 at one end is pivotally connected to one arm of the lever 178 and at its opposite end passes loosely through a hole in the end of lever 174 to provide a lost motion connection between this lever and rod 176. The end of the lever 178 opposite the end to which rod 176 is attached rests upon the extension 166a of arm 166 of the bell crank lever.

The operation of the above described form of apparatus is more or less obvious from the drawings. With pedal 172 in depressed position as indicated in the drawings, throttle 20 is in open position and the shaft 62 is in a position of rotation such that full stroke of the pump plungers is permitted. With the apparatus in this position the shaft 78 is free insofar as the control apparatus is concerned, to turn in clockwise direction to its limiting position under the influence of a suitable retracting spring 180 so that the sleeves 80 associated with shaft 78 will be out of contact with the pump plungers. As the control pedal is permitted to rise under the influence of its retracting spring, links 162 and 164 are lifted by movement of the bell crank lever to effect closure of the throttle and simultaneous movement of shaft 62 in clockwise direction to decrease the amount of fuel supplied by the pump unit. Closing movement of the control pedal from a position corresponding to full load operation to a position corresponding to part load operation with throttled admission of air has no effect upon the position of shaft 78 due to the lost motion connection between lever 174 and rod 176. As the throttle is closed and the shaft 162 is moved to effect decrease of the fuel supply by upward movement of the bell crank arm 166 and links 164 and 162, the lever 178 is moved in counterclockwise direction as seen in Fig. 7, and rod 176 is moved downwardly. Downward movement of rod 176 from the position shown in the figure has no effect on the position of shaft 78 until the enlarged head 176a of this rod makes contact with the end of lever 174 and the length of rod 176 is made such that shaft 78 is not turned in counterclockwise direction from the position shown in the figure to a position effecting cutting out of the desired pumps until throttle 20 is moved to the predetermined position where it is desired that one or more of the pumps be cut out of action.

In order to positively limit the minimum pressure which can be obtained in the inlet passage 14, auxiliary air openings may be employed. These may be either independent or combined with the apparatus for controlling the fuel supply in accordance with intake pressure. For example, ports 130 and 132 may be made sufficiently large for this purpose.

From the foregoing description it will be evident to those skilled in the art that many variations may be employed in the exercise of the invention, which is to be understood as not limited to the forms of apparatus herein disclosed.

What I claim is:

1. Apparatus of the character described comprising a multiple cylinder internal combustion engine having an inlet manifold for supplying combustion air to the cylinders of the engine, a plurality of fuel pumps for supplying fuel separately to the cylinders of the engine, a throttle valve for controlling admission of air to said manifold, pump regulating means operative in response to decrease in pressure in the inlet manifold to decrease the amount of fuel supplied by said pumps, and means operative in response to the pressure in said inlet manifold for rendering one or more but less than the total number of said pumps inoperative to supply fuel when the pressure in the inlet manifold is below a predetermined value.

2. Apparatus of the character described comprising a multiple cylinder internal combustion engine having an inlet manifold for supplying combustion air to the cylinders of the engine, a plurality of fuel pumps for supplying fuel separately to the cylinders of the engine, a throttle valve for controlling admission of air to said manifold, pressure responsive regulating means operative in response to decrease in pressure in the inlet manifold to decrease the amount of fuel supplied by the pumps, electrical means for rendering one or more but less than the total number of said pumps inoperative to supply fuel, and pressure responsive means operative to cause said electrical means to be energized when the pressure in said inlet manifold is below a predetermined value.

3. In the operation of multiple cylinder internal combustion engines of the injection type, the improved method which comprises progressively throttling the air supplied in the low load range of engine operation as the load decreases, supplying to each of the several cylinders substantially the same amount of fuel as that supplied to each of the remaining cylinders throughout the range of engine loads in which fuel is supplied to all cylinders, varying the amount of fuel supplied in the last mentioned range in accordance with variations in load on the engine, cutting off the fuel supply to one or more but less than the total number of cylinders when the pressure of the throttled air falls to a predetermined minimum value and supplying fuel to all of the cylinders when the pressure of the air exceeds said predetermined value.

4. In the operation of multiple cylinder internal combustion engines of the injection type, the improved method which comprises progressively throttling the air supplied in the low load range of the engine as the load decreases, supplying to each of the several cylinders substantially the same amount of fuel as that supplied to each of the remaining cylinders throughout the range of engine loads above idling load, varying the amount of fuel supplied in the last mentioned range in accordance with variations in load on the engine, and cutting off the fuel supply to one or more but less than the total number of the cylinders in response to decrease in the pressure of the throttled air corresponding to idling load.

5. Apparatus of the character described comprising a multiple cylinder internal combustion engine having an inlet manifold for supplying combustion air to the cylinders of the engine, means for injecting fuel separately into each of the cylinders of the engine, means for causing the first mentioned means to supply substantially equal amounts of fuel at any given load on the engine to each of the several cylinders in operation at said load, means for throttling the air admitted to said manifold and means operative in response to a predetermined value of vacuum of said inlet manifold for cutting off the supply of fuel to one or more but less than the total number of said cylinders.

6. That improvement in the operation of a multiple cylinder internal combustion engine of the injection type which consists in throttling the admission of air to the engine to compensate for reduction in engine load, reducing the amount of fuel injected to the cylinders of the engine in accordance with reduction in the pressure of the throttled air supply, limiting the supply of fuel to a pre-determined number of cylinders less than the total number whenever the air supply to the engine is throttled to an extent appropriate for idling operation and at any given value of load on the engine supplying substantially like amounts of fuel to all of the cylinders to which fuel is then supplied.

7. That improvement in the operation of a multiple cylinder internal combustion engine of the injection type which consists in controlling operation of the engine by throttling the admission of air to the engine to compensate for reduction in engine load, reducing the amount of fuel injected to the cylinders of the engine in response to reduction in the pressure of the throttled air supply, limiting the supply of fuel to a pre-determined number of cylinders less than the total number whenever the engine is throttled to an extent appropriate for idling operation and at any given value of load on the engine supplying substantially like amounts of fuel to all of the cylinders to which fuel is then supplied.

8. That improvement in the operation of a multiple cylinder internal combustion engine of the injection type which consists in throttling the admission of air to the engine to compensate for reduction in engine load, reducing the amount of fuel injected to the cylinders of the engine in accordance with reduction in the pressure of the throttled air supply, cutting off the supply of fuel suddenly and substantially simultaneously to a pre-determined number of cylinders less than the total number whenever the engine is throttled to an extent appropriate for substantially idling operation of the engine and at any given value of load on the engine supplying substantially like amounts of fuel to all of the cylinders to which fuel is then supplied.

9. Apparatus of the character described comprising a multiple cylinder internal combustion engine having an inlet manifold for supplying combustion air to the cylinders of the engine, means for injecting fuel separately into each of the cylinders of the engine, means for causing the first mentioned means to supply substantially like amounts of fuel at any given load on the engine to each of the cylinders to which fuel is then supplied, means for throttling the air admitted to said manifold and means for automatically limiting the supply of fuel to a predetermined fixed number of cylinders less than the total number of cylinders whenever the air is throttled to an extent appropriate for idling operation of the engine.

10. Apparatus of the character described comprising a multiple cylinder internal combustion engine having an inlet manifold for supplying combustion air to the cylinders of the engine, means for injecting fuel separately into each of the cylinders of the engine, means for causing the first mentioned means to supply substantially like amounts of fuel at any given load on the engine to each of the cylinders to which fuel is then supplied, means for throttling the air admitted to said manifold and means automatically operative to abruptly and substantially simultaneously cut off the supply of fuel to a pre-determined fixed number of cylinders less than the total number of cylinders whenever the throttling means is moved to a partially closed position to throttle the air supply to an extent appropriate for substantially idling operation of the engine.

11. Apparatus of the character described comprising a multiple cylinder internal combustion engine having an inlet manifold for supplying combustion air, a throttle for controlling flow of air through said manifold, means responsive to variations in the pressure of the throttled air for injecting variable quantities of fuel separately into each of the cylinders of the engine, said means supplying substantially like amounts of fuel at any given load on the engine to each of the cylinders to which fuel is then supplied and means for limiting the supply of fuel to a predetermined fixed number of cylinders less than the total number of cylinders whenever the load on the engine falls to a value requiring a high degree of throttling of the air to reduce the fuel quantity to an extent appropriate for the load.

12. Apparatus of the character described comprising a multiple cylinder internal combustion engine having an inlet manifold for supplying combustion air, a throttle for controlling flow of air through said manifold, means responsive to variations in the pressure of the throttled air for injecting variable quantities of fuel separately into each of the cylinders of the engine, said means supplying substantially like amounts of fuel at any given load on the engine to each of the cylinders to which fuel is then supplied and means actuated upon movement of said throttle to a position providing a highly throttled air supply to the engine for automatically and substantially simultaneously cutting off the supply of fuel to a pre-determined fixed number of cylinders less than the total number of cylinders.

13. Apparatus of the character described comprising a multiple cylinder internal combustion engine having an inlet manifold for supplying combustion air, a throttle for controlling flow of air through said manifold, means responsive to variations in the pressure of the throttled air for injecting variable quantities of fuel separately into each of the cylinders of the engine, said means supplying substantially like amounts of fuel at any given load on the engine to each of the cylinders to which fuel is then supplied, electrically actuated means for causing the supply of fuel to a pre-determined fixed number of cylinders less than the total number of cylinders to be abruptly and substantially simultaneously cut off and means operatively associated with said throttle for energizing said electrically actuated means whenever said throttle is in a position providing a highly throttled air supply to the engine.

14. Apparatus of the character described comprising a multiple cylinder internal combustion engine having an inlet manifold for supplying combustion air, a plurality of fuel pumps for supplying fuel separately to the cylinders of the engine, pump actuating means for causing the pumps to supply substantially like amounts of fuel at any given load on the engine to each of the cylinders to which fuel is then supplied, throttling means for controlling the flow of air through said inlet manifold and means operatively associated with said throttling means for rendering a predetermined fixed number of pumps less than the total number of pumps inoperative to supply fuel whenever the throttling means is in a position providing a highly throttled air supply to the engine.

15. Apparatus of the character described comprising a multiple cylinder internal combustion engine having an inlet manifold for supplying combustion air, a plurality of fuel pumps for supplying fuel separately to the cylinders of the engine, pump actuating means for causing the pumps to supply substantially like amounts of fuel at any given load on the engine to each of the cylinders to which fuel is then supplied, throttling means for controlling the flow of air through said inlet manifold, means responsive to the pressure of the throttled air for governing said fuel pumps to reduce the quantity of fuel supplied as the pressure of the throttled air decreases, electrically actuated means for automatically and substantially simultaneously rendering a pre-determined fixed number of said pumps less than the total number of pumps inoperative to supply fuel and means operatively associated with said throttling means for energizing said electrically actuated means whenever said throttling means is in a position providing a highly throttled air supply to the engine.

TORBJÖRN VIKTOR DILLSTRÖM.